United States Patent
Tsudome et al.

(10) Patent No.: US 7,796,481 B2
(45) Date of Patent: Sep. 14, 2010

(54) INFORMATION RECORDING APPARATUS, INFORMATION RECORDING METHOD AND INFORMATION RECORDING PROGRAM

(75) Inventors: Hirohisa Tsudome, Saitama (JP); Kanji Ishihara, Saitama (JP)

(73) Assignee: Pioneer Corporation, Tokyo (JP)

( * ) Notice: Subject to any disclaimer, the term of this patent is extended or adjusted under 35 U.S.C. 154(b) by 922 days.

(21) Appl. No.: 11/167,225

(22) Filed: Jun. 28, 2005

(65) Prior Publication Data
US 2006/0002259 A1    Jan. 5, 2006

(30) Foreign Application Priority Data
Jun. 30, 2004    (JP) .............................. 2004-193409

(51) Int. Cl.
*G11B 7/00* (2006.01)
(52) U.S. Cl. ................ 369/47.1; 369/44.27; 369/44.34; 369/124.01; 369/47.5
(58) Field of Classification Search ............. 369/44.27, 369/44.34, 47.5, 47.1, 124.01
See application file for complete search history.

(56) References Cited

U.S. PATENT DOCUMENTS

| | | | | |
|---|---|---|---|---|
| 5,268,893 A * | 12/1993 | Call et al. | ................. | 369/47.52 |
| 5,442,609 A * | 8/1995 | Yanagawa | ................. | 369/44.28 |
| 6,920,097 B2 * | 7/2005 | Kim | ........................ | 369/47.53 |
| 2002/0054552 A1 * | 5/2002 | Ohtsuka | ................... | 369/47.53 |
| 2002/0067670 A1 * | 6/2002 | Akiyama et al. | .......... | 369/47.52 |
| 2005/0036415 A1 * | 2/2005 | Yoshida et al. | ........... | 369/47.53 |
| 2005/0052969 A1 * | 3/2005 | Lee | ............................. | 369/47.5 |
| 2005/0105418 A1 * | 5/2005 | Kuwahara et al. | .......... | 369/47.5 |
| 2005/0128913 A1 * | 6/2005 | Yun | ......................... | 369/53.26 |

FOREIGN PATENT DOCUMENTS

| | | |
|---|---|---|
| JP | 07-085494 | 3/1995 |
| JP | 2004-086951 | 3/2004 |

OTHER PUBLICATIONS

Machine translation of Japan publication No. 07-085494 on Mar. 31, 1995 by Kurashina Hiroyuki.*

* cited by examiner

*Primary Examiner*—Wayne R Young
*Assistant Examiner*—Linh T Nguyen
(74) *Attorney, Agent, or Firm*—Nixon & Vanderhye, PC (57) ABSTRACT

An information recording apparatus which irradiates a laser light onto a recording medium such as a DVD+R to record information records an adjustment RF signal in a PCA used for calibration of the laser light (OPC process). Thereby, on the recording medium having no recorded area of an RF signal in an entire circumference, such as the DVD+R, it becomes possible that the adjustment RF signal is recorded in the PCA to be read out and a mechanism adjustment and the like are executed. In addition, the information recording apparatus searches the inside of the PCA in order from the area having highly possibility that the adjustment RF signal is recorded. Thereby, the adjustment RF signal in the PCA can be rapidly detected.

23 Claims, 7 Drawing Sheets

INFORMATION RECORDING APPARATUS, INFORMATION RECORDING METHOD AND INFORMATION RECORDING PROGRAM

BACKGROUND OF THE INVENTION

1. Field of the Invention

The present invention relates to a technique of recording information onto a recording medium such as an optical disc.

2. Description of Related Art

Generally, in an information recording apparatus which records information on a recording medium such as an optical disc, it is necessary to perform an adjustment such as a mechanism adjustment by using an RF signal recorded in an RF portion for the purpose of improving recording property. As the mechanism adjustment, there are proposed a focus position adjustment of an optical pickup and spherical aberration correction of a liquid crystal tilt, for example.

On the recording medium recordable once such as a DVD+R and a double layer DVD+R (DVD+R having two layers), there is no area of a pre-write portion in which the RF signal is recorded in an entire circumference. Thus, on such a recording medium, the RF signal used for the mechanism adjustment at the time of recording data on a disc cannot be obtained.

SUMMARY OF THE INVENTION

The present invention has been achieved in order to solve the above problems. It is an object of this invention to provide an information recording apparatus, an information recording method and an information recording program capable of recording, in an appropriate recording area, an adjustment RF signal such as a mechanism adjustment for the purpose of improving a recording characteristic and capable of rapidly reading out the recorded RF signal.

According to one aspect of the present invention, there is provided an information recording apparatus which irradiates a laser light onto a recording medium and records information, including: a recording unit which records an adjustment RF signal in a predetermined area on the recording medium used for calibrating the laser light; and a detecting unit which detects the adjustment RF signal recorded in the predetermined area.

The above information recording apparatus irradiates the laser light onto the recording medium such as an optical disc of a DVD+R standard recordable once (hereinafter referred to as "DVD+R"), and records the information. The information recording apparatus uses the predetermined area on the recording medium to perform the calibration of the laser light including the adjustment of a power of the laser light (i.e., laser power). Moreover, the information recording apparatus records the adjustment RF signal in the predetermined area. Thereby, the adjustment RF signal can be recorded onto an information recording medium of a type having no recorded RF signal in any area, e.g., onto the recording medium such as the DVD+R, and the adjustment RF signal can be detected from the predetermined area. Therefore, to the above-mentioned information recording medium on which the RF signal is not recorded, the adjustment to be performed by using the RF signal, e.g., the mechanism adjustment, can be performed.

In one form of the above information recording apparatus, the adjustment RF signal may include position information indicating a recording position of the RF signal on the recording medium. After the adjustment RF signal is recorded onto the information recording medium, the adjustment by using the recorded RF signal such as the mechanism adjustment is performed by using the adjustment RF signal. Therefore, if the position information indicating the recording position on the information recording medium is recorded in the adjustment RF signal, at the time of performing the mechanism adjustment afterward, the recording position of the adjustment RF signal, concretely a recording start position and a recording end position, can be rapidly found on the basis of the position information.

In another form of the above information recording apparatus, the detecting unit may include a unit which obtains an RF signal from the predetermined area and a determining unit which determines the RF signal as the adjustment RF signal when the obtained RF signal is decodable. Since the adjustment RF signal is used for the adjustment by using the recorded RF signal in the subsequent process, quality of a certain level is necessary. Therefore, as the quality of the level usable for the subsequent adjustment, it is assumed that possibility/impossibility of decoding the adjustment RF signal is a standard of determining the quality. The information recording apparatus operates the decodable RF signal as the adjustment RF signal.

In still another form of the above information recording apparatus, the detecting unit may determine that the adjustment RF signal is not recorded in the predetermined area, when information amount of information recorded in the predetermined area is smaller than unit information amount of the adjustment RF signal, when the determining unit determines that substantially entire information in the predetermined area is not the adjustment RF signal, or when a time period or a number of times for which or at which the determining unit executes determination satisfies a predetermined condition. Thereby, without unnecessarily searching the inside of the predetermined area, it can be determined whether or not the RF signal is recorded in the predetermined area. Therefore, it can be prevented to waste time in detecting the RF signal.

In still another form of the above information recording apparatus, the recording unit may record the adjustment RF signal in an unrecorded area adjacent to an area in which the information data is recorded in the predetermined area, when the detecting unit determines that the adjustment RF signal is not recorded in the predetermined area. Thereby, it can be prevented to waste the above-mentioned predetermined area.

In still another form of the above information recording apparatus, the determining unit may first determine whether or not the adjustment RF signal exists within a range of predetermined data amount from a start position of the predetermined area, and may determine whether or not the information is the adjustment RF signal in order from latest recorded information in the predetermined area when determining that the adjustment RF signal does not exist within the range. Namely, the information recording apparatus performs the search in order from the area having such highly possibility that the RF signal is recorded. Thereby, the RF signal in the predetermined area can be rapidly searched.

The adjustment RF signal may be used for a mechanism adjustment in an optical pickup. As the mechanism adjustment, there are a focus position adjustment and spherical aberration correction of a liquid crystal tilt, for example.

In addition, as the above-mentioned recording medium, there is the DVD+R for example, and the recording unit records the adjustment RF signal in a PCA (Power Control Area) of the DVD+R. Thereby, on the recording medium having no recorded area of the RF signal in the entire circumference such as the DVD+R, if the adjustment RF signal is recorded in the PCA, the mechanism adjustment and other necessary adjustment can be performed by using the adjustment RF signal.

According to another aspect of the present invention, there is provided an information recording method which irradiates a laser light onto a recording medium and records information, including: a recording process which records an adjustment RF signal in a predetermined area on the recording medium used for calibrating the laser light; and a detecting process which detects the adjustment RF signal recorded in the predetermined area. According to the information recording method, similarly to the above-mentioned information recording apparatus, the adjustment to be performed by using the RF signal, e.g., the mechanism adjustment, can be also performed to the information recording medium on which the RF signal is not recorded.

According to still another aspect of the present invention, there is provided an information recording program executed by an information recording apparatus having a computer and an optical pickup irradiating a laser light onto a recording medium, making the computer function as: a recording control unit which controls the optical pickup so that an adjustment RF signal is recorded in a predetermined area on the recording medium used for calibrating the laser light; and a detecting control unit which controls the optical pickup so that the adjustment RF signal recorded in the predetermined area is detected. By making the computer in the information recording apparatus execute the information recording program, similarly to the above-mentioned information recording apparatus, the adjustment to be performed by using the RF signal, e.g., the mechanism adjustment, can be performed to the information recording medium on which the RF signal is not recorded.

The nature, utility, and further features of this invention will be more clearly apparent from the following detailed description with respect to preferred embodiment of the invention when read in conjunction with the accompanying drawings briefly described below.

DETAILED DESCRIPTION OF THE PREFERRED EMBODIMENTS

The preferred embodiments of the present invention will now be described below with reference to the attached drawings.

[Recording Format of Optical Disc]

First, the description will be given of a recording format of an optical disc D according to an embodiment of the present invention with reference to FIG. 1 and FIG. 2.

Figure 1:
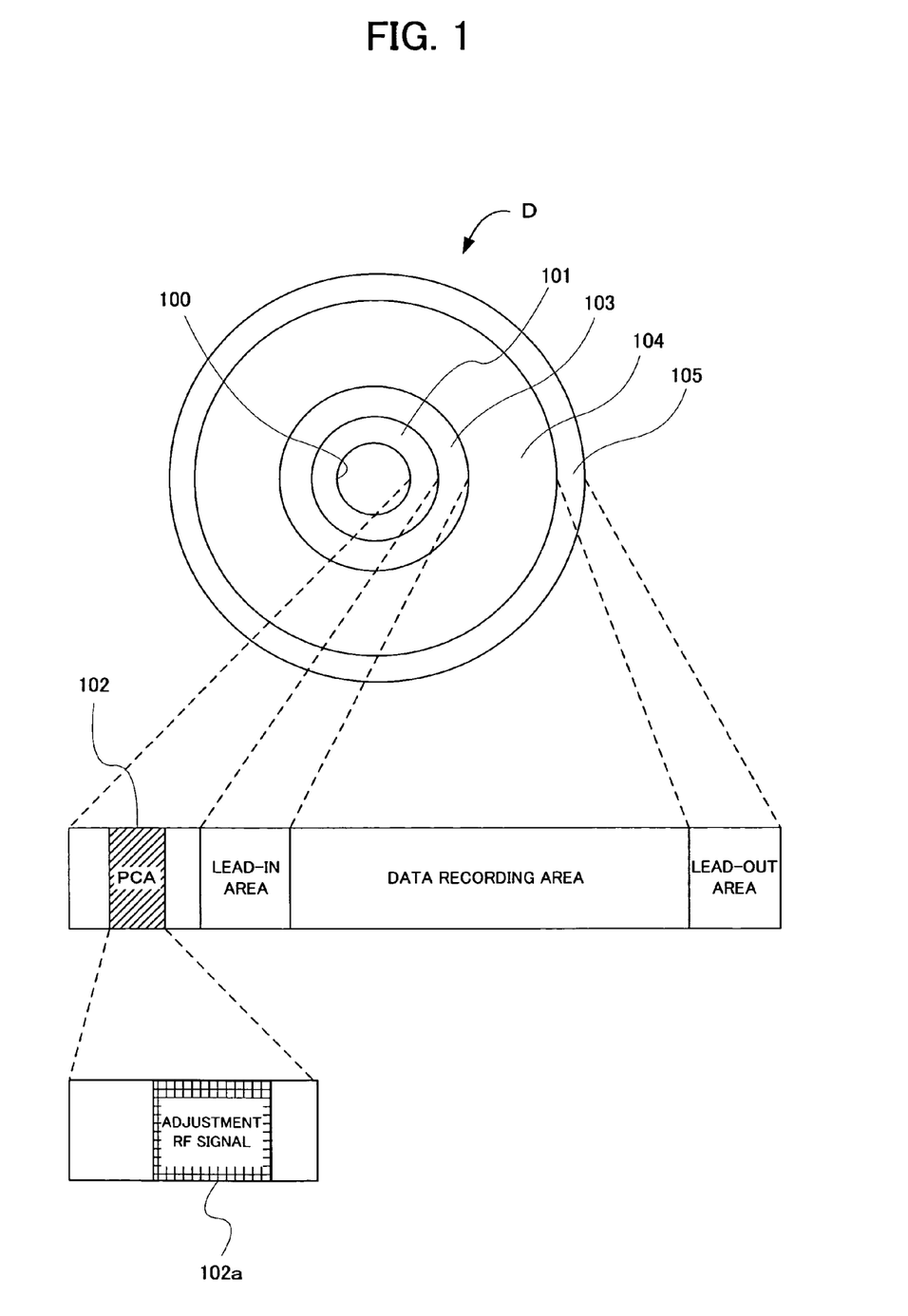
FIG. 1 is a diagram schematically showing a recording format of an optical disc according to an embodiment of the present invention.

FIG. 1 schematically shows a plan view of a configuration of the optical disc D having plural areas at the upper portion of the drawing, and a diagram of an area structure in a radial direction at the bottom portion thereof, which corresponds to the above plan view.

As shown in FIG. 1, on the optical disc D, an inner drive area 101, a lead-in area 103, a data recording area 104 and a lead-out area 105 are provided from an inner circumference to an outer circumference with a center hole 100 as a center. In each area, groove tracks and land tracks are alternately provided spirally or concentrically with the center hole 100 as the center. The groove track may be wobbled, or prepits may be formed on one or both of the tracks. As the optical disc D, various kinds of optical discs such as the DVD+R recordable once can be used.

In the lead-in area 103 and the lead-out area 105, various kinds of information used at the time of recording the data and reproducing the recorded data is recorded. In the data recording area 104, contents information such as music and video is recorded.

In the inner drive area 101, as shown by a diagonal area at the middle of FIG. 1, the PCA 102 is provided. The PCA 102 is mainly used for measuring and setting the optimum power of the laser light (laser power) in recording the information on the optical disc D, i.e., for executing an OPC (Optimum Power Calibration) process. Concretely, when the optical disc D is inserted and a recording command is inputted, light strength is gradually switched in order. Subsequently, test writing data is recorded in the PCA 102, and a so-called test writing process is executed. Afterward, the test writing data thus recorded is reproduced, and a reproduction result thereof is determined by a predetermined evaluation standard. Thus the optimum laser power is set.

In this embodiment, the RF signal used for the adjustment (hereinafter referred to as "adjustment RF signal") such as the mechanism adjustment is recorded in the above-mentioned PCA 102. Concretely, as shown by a netted area at the bottom of FIG. 1, the adjustment RF signal is recorded in the PCA 102. The adjustment RF signal is used for performing the adjustment of the focus position of the optical pickup, the mechanism adjustment such as the spherical aberration correction of the liquid crystal tilt and other adjustment. Like this, the reason for recording the adjustment RF signal in the PCA 102 is that since the recording medium recordable once such as the DVD+R has no area in which the RF signal is recorded in the entire circumference, the adjustment of using the recorded RF signal such as the mechanism adjustment cannot be performed for the recording medium.

Next, the description will be given of a concrete recording structure of the PCA 102 with reference to FIG. 2. FIG. 2 shows an enlarged portion of the PCA 102 on the optical disc D. The left side of the drawing shows the inner circumferential side of the optical disc D, and the right side thereof shows the outer circumferential side of the optical disc D.

Figure 2:
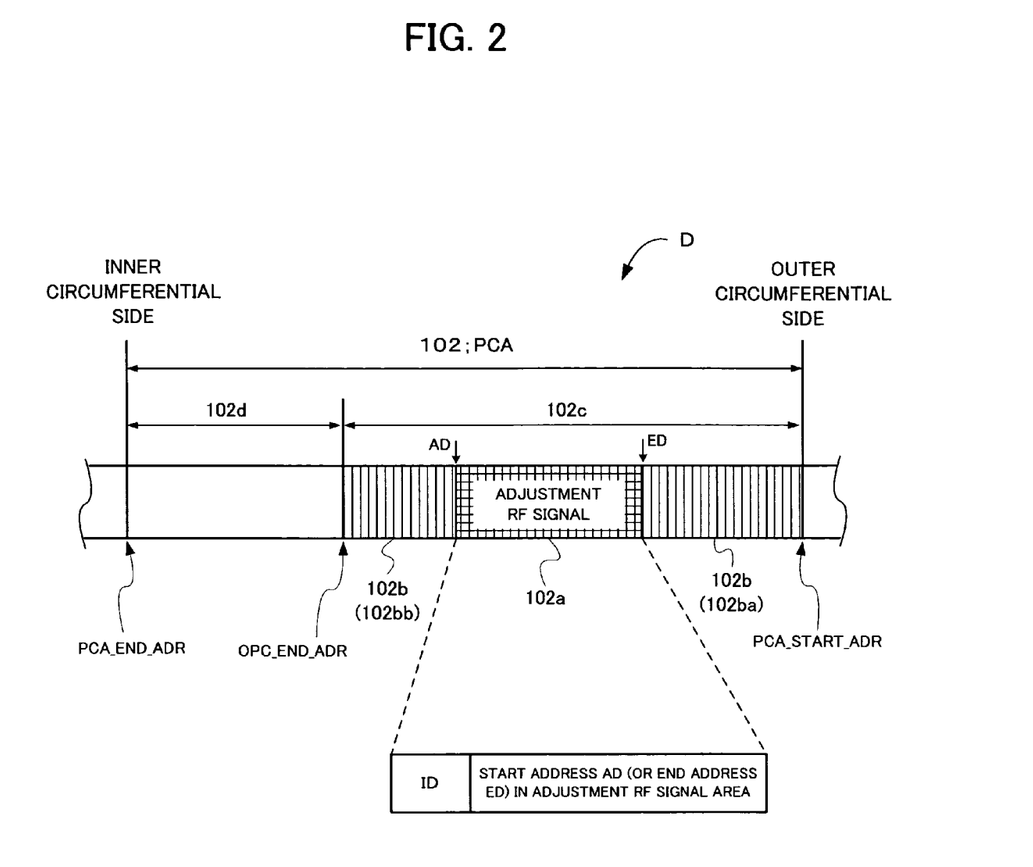
FIG. 2 is a diagram showing a recording structure of a PCA according to the embodiment of the present invention.

As shown in FIG. 2, an area from a start address PCA_START_ADR (hereinafter simply referred to as "PCA_START_ADR") to an end address PCA_END_ADR is used as the PCA 102. The PCA 102 is mainly used for the OPC process. Concretely, at the time of the OPC process, the test writing data is written in order from the outer circumferential side of the optical disc to the inner circumferential side in the PCA 102. Hereinafter, the area used for the OPC process is referred to as "OPC area 102b". Moreover, in this embodiment, the adjustment RF signal is recorded in the PCA 102 (hereinafter, the area in which the adjustment RF signal is recorded is referred to as "adjustment RF signal area 102a"). In an example shown in FIG. 2, in the PCA 102, an OPC area 102ba, the adjustment RF signal area 102a, an OPC area 102bb are arranged in order from the outer circumferential side. This indicates that the adjustment RF signal is recorded after the OPC process and afterward the OPC process is further executed. In this case, an address OPC_END_ADR shows the end address of the data recorded by the newest OPC process, which will be referred to as "OPC end address" hereinafter. Since the OPC process is normally executed after the mechanism adjustment is performed by using the adjustment RF signal, the area adjacent to the inner circumferential side of the adjustment RF signal area 102a becomes the OPC area 102b.

In addition, the hatched area in FIG. 2, concretely, the area in the PCA 102 used for the OPC process and recording of the adjustment RF signal, is referred to as used area 102c. The used area 102c of the PCA 102 includes at least the adjustment RF signal area 102a or the OPC area 102b. As described above, since the vicinity of the end address of the used area 102c is used as the OPC area 102b, the end address of the used area 102c is identical to the OPC end address OPC_END_ADR. Moreover, in the PCA 102, an area in which the data is not recorded (non-hatched area in FIG. 2) is referred to as unused area 102d.

It is preferable that the adjustment RF signal area 102a has an area of at least 3 tracks (approximately 9 ECC in a case that the mechanism adjustment is performed on the inner circumferential side) in order to securely read the adjustment RF signal without being affected by the test writing data recorded in the OPC process. Generally, when the data of one track is read, a portion of the optical beam is irradiated onto the tracks on both sides thereof (inner circumferential side and outer circumferential side), and a return light thereof is received by a receiving light unit of the optical pickup. Since the OPC area 102b is an area in which the laser power is largely varied and the test writing is performed, if the light beam covers the OPC area 102b at the time of reading the adjustment RF signal, the reading the adjustment RF signal may become unstable due to an effect of the return light. Therefore, the adjustment RF signal is recorded so that the adjustment RF signal area 102a has at least the area of 3 tracks, and the adjustment RF signal is read by tracing the center track. Thereby, there is no adverse effect due to the OPC areas 102b in front and behind. In the case of the DVD+R, though 3 tracks correspond to approximately 9 ECC in the vicinity of the inner circumference of the disc, the size of the adjustment RF signal area 102a is set to 16 ECC with margin in this embodiment.

In addition, in the adjustment RF signal area 102a, the related information related to the information recording apparatus and the position information indicating the recording position of the adjustment RF signal on the optical disc D are recorded. A bottom portion in FIG. 2 shows a concrete example of those pieces of information recorded in the adjustment RF signal area 102a. As the related information related to the information recording apparatus, a manufacturer of the information recording apparatus, i.e., a manufacture ID and the like, is recorded, for example. The related information has significance as information indicating that the adjustment RF signal is an effective RF signal. The "effective RF signal" means the RF signal having recording quality usable for the subsequent adjustment such as the mechanism adjustment. Concretely, the effective RF signal may be an RF signal having decodable quality or an RF signal having an error rate smaller than a predetermined value. In the present invention, the adjustment RF signal indicates the above-mentioned effective RF signal. From this point of view, by determining whether or not the ID as the related information obtained from the optical disc D is identical to the ID included in the information recording apparatus, the information recording apparatus can immediately determine whether or not the RF signal recorded in the PCA 102 on the optical disc D is the effective RF signal, i.e., the adjustment RF signal.

On the contrary, as the above-mentioned position information, the information of the area in which the adjustment RF signal is recorded, i.e., the information of the start address AD or the end address ED of the adjustment RF signal area 102a, is recorded for example. In FIG. 2, the start address AD of the recording area of the adjustment RF signal corresponds to an end portion on the inner circumferential side in the adjustment RF signal area 102a, and the end address ED corresponds to an end portion on the outer circumferential side of the adjustment RF signal area 102a. By obtaining the position information, the information recording apparatus can grasp the recording area of the adjustment RF signal, and can rapidly detect the portion actually used for the mechanism adjustment in the adjustment RF signal area 102a.

[Configuration of Information Recording and Reproduction Apparatus]

Next, the description will be given of an information recording and reproduction apparatus, which is an example of the information recording apparatus of the present invention, with reference to FIG. 3 and FIG. 4.

Figure 3:
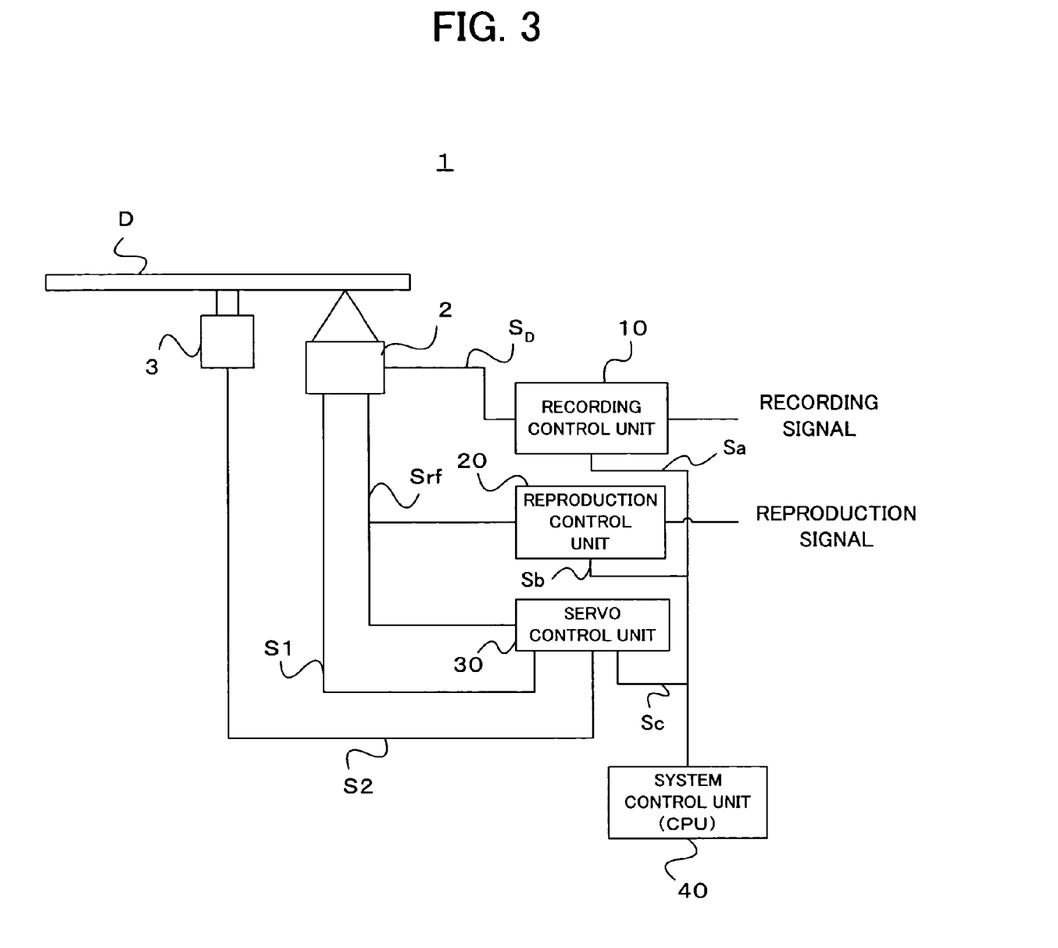
FIG. 3 is a block diagram schematically showing a configuration of an information recording and reproduction apparatus to which the present invention is applied.
Figure 4:
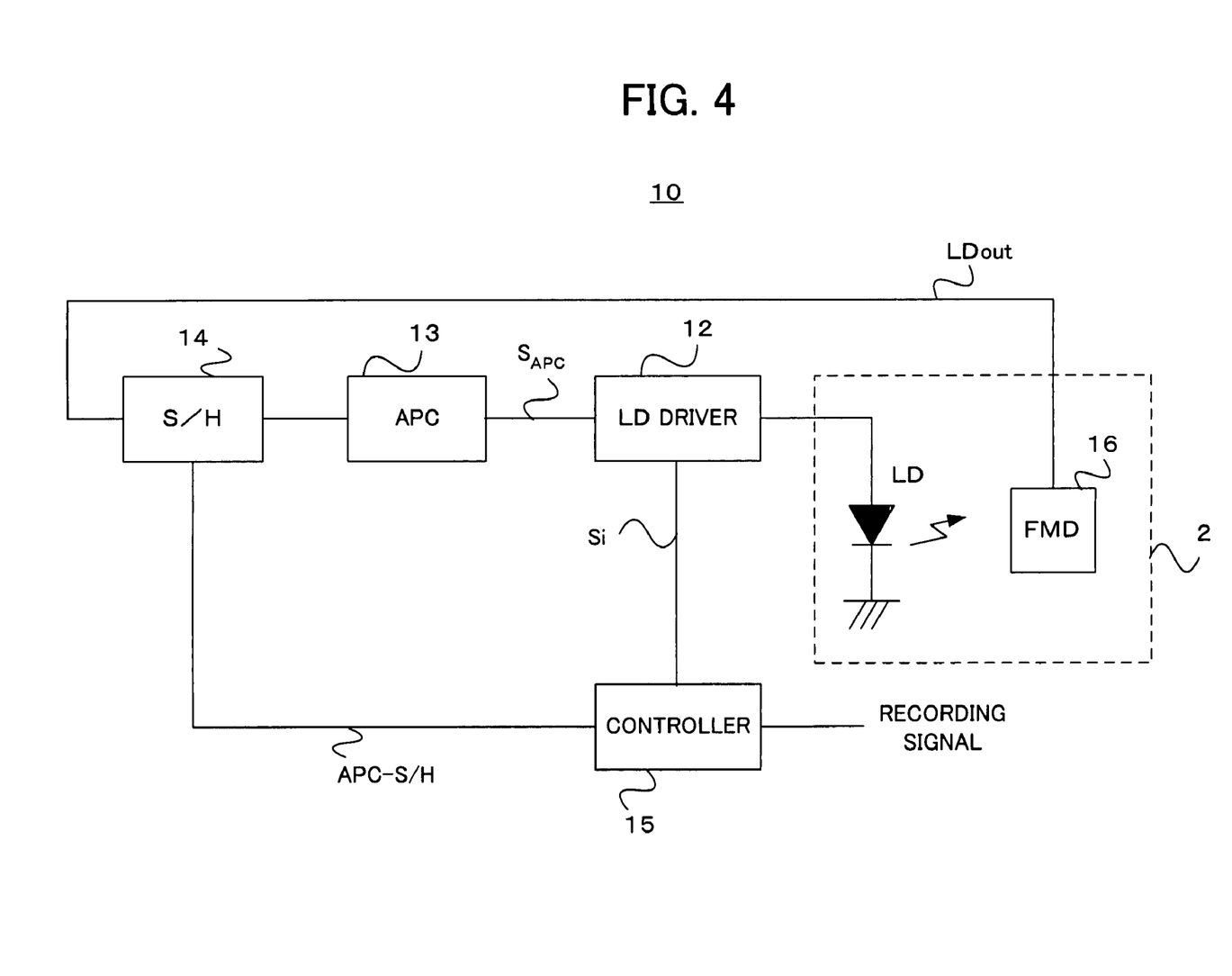
FIG. 4 is a block diagram showing a configuration of a recording control unit shown in FIG. 3.

FIG. 3 schematically shows an entire configuration of the information recording and reproduction apparatus to which the present invention is applied. An information recording and reproduction apparatus 1 records the information on the optical disc D and reproduces the information from the optical disc D.

The information recording and reproduction apparatus 1 includes an optical pickup 2 for irradiating a recording beam and a reproduction beam to the optical disc D, a spindle motor 3 for controlling rotation of the optical disc D, a recording control unit 10 for controlling recording of information on the optical disc D, a reproduction control unit 20 for controlling reproduction of information recorded on the optical disc D, a servo control unit 30 for various kinds of servo controls including a spindle servo for controlling rotation of the spindle motor 3, and a focus servo and tracking servo for controlling a relative position of the optical pickup 2 to the optical disc D, and a system control unit (CPU) 40 for controlling the recording control unit 10, the reproduction control unit 20 and the servo control unit 30.

The recording control unit 10 receives recording signal. Then, the recording control unit 10 generates a driving signal $S_D$ for driving a laser diode in the optical pickup 2 and supplies the driving signal $S_D$ to the optical pickup 2.

The description will be given of the concrete configuration of the recording control unit 10 with reference to FIG. 4. FIG. 4 shows the internal configuration of the optical pickup 2 and the recording control unit 10. As shown in FIG. 4, the optical pickup 2 includes the laser diode LD which generates the recording beam for recording the information onto the optical disc D and the reproduction beam for reproducing the information from the optical disc D, and a front monitor diode (FMD) 16 which receives the laser light emitted from the laser diode LD and outputs the laser power level signal LD out corresponding to the laser light.

The optical pickup 2 further includes known components, which will not be shown or described in detail. These components include a photo-detector for receiving a reflection beam of the reproduction beam reflected from the optical disc D and generating the read-out RF signal Srf, and an optical system for guiding the recording and reproduction beams and the reflection beam to appropriate directions.

The recording control unit 10 includes a laser diode (LD) driver 12, an APC (Automatic Power Control) circuit 13, a sample-and-hold (S/H) circuit 14, and a controller 15.

The LD driver 12 supplies a current corresponding to the recording signal to the laser diode LD, and records the information onto the optical disc D. The front monitor diode 16, which is arranged in the vicinity of the laser diode LD in the optical pickup 2, receives the laser light emitted from the laser diode LD, and outputs the laser power level signal LD out indicating a level thereof.

The sample-and-hold circuit 14 samples and holds the level of the laser power level signal LD out at the timing prescribed by a sample-and-hold signal APC-S/H. Based on the output signal from the sample-and-hold circuit 14, the APC circuit 13 controls the power of the LD driver 12 so that the bias power level of the laser light emitted from the laser diode LD becomes constant.

The controller 15 mainly performs recording operation. The controller 15 generates a control signal Si which controls a current amount supplied to the laser diode LD. By supplying the control signal Si to the LD driver 12, the controller 15 performs the recording operation. It is not limited that the controller 15 is provided in the recording control unit 10. In stead of the controller 15, the system control unit 40, which will be described later, may execute the above-mentioned process.

Returning to FIG. 3, the reproduction control unit 20 will be explained. The reproduction control unit 20 receives the read-out RF signal Srf outputted from the optical pickup 2, and performs predetermined processes such as demodulation and decoding on the read-out RF signal Srf to generate and output the reproduction signal.

The servo control unit 30 receives the read-out RF signal Srf from the optical pickup 2. Based on the read-out RF signal Srf, the servo control unit 30 supplies a servo signal S1 such as a tracking error signal and a focus signal to the optical pickup 2 and supplies a spindle servo signal S2 to the spindle motor 3. Thereby, various kinds of servo processing, such as the tracking servo, the focus servo, and the spindle servo, are performed.

Since the invention mainly relates to the recording methods in the recording control unit 10 and various known methods can be applied to the reproduction control and the servo control, these controls will not be described in detail.

The system control unit 40 supplies the control signals Sa, Sb and Sc to the recording control unit 10, the reproduction control unit 20 and the servo control unit 30, respectively. In this embodiment, the system control unit 40 mainly and totally executes the control involved with to the recording and detecting process of the adjustment RF signal, which will be explained later. Concretely, when the instruction of recording data is given by the user, the system control unit 40 supplies the control signals Sb and Sc to the reproduction control unit 20 and the servo control unit 30 so that the detecting process of the adjustment RF signal recorded in the PCA 102 of the optical disc D is executed. Moreover, when the adjustment RF signal is not detected from the PCA 102 of the optical disc D, the system control unit 40 supplies the control signal Sa to the recording control unit 10 to record the adjustment RF signal in the PCA 102. In addition, the system control unit 40 controls each control unit in order to execute the mechanism adjustment on the basis of the obtained adjustment RF signal, and controls each control unit in executing the OPC process.

As described above, the system control unit 40 functions as the recording unit and the detecting unit of the adjustment RF signal.

Though the information recording and reproduction apparatus is shown as one embodiment of the present invention in FIG. 3, the present invention is applicable to an information recording apparatus dedicated to recording, too.

[Recording and Detecting Process of RF Signal]

The description will be given of the recording control executed by the above-mentioned system control unit 40 below, with reference to FIG. 5, FIG. 6 and FIGS. 7A to 7D.

Figure 5:
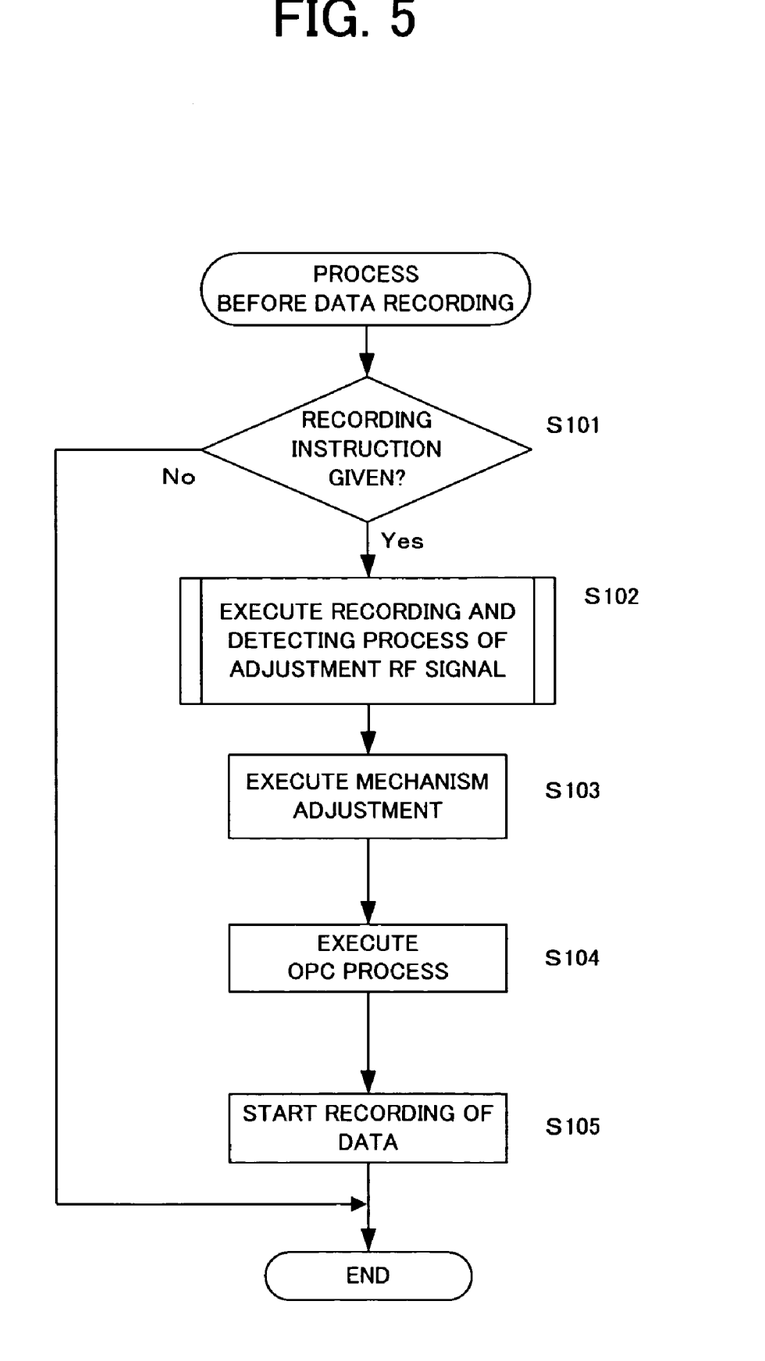
FIG. 5 is a flow chart showing a process before data recording according to the present invention.

FIG. 5 is a flow chart showing a process executed before the information recording and reproduction apparatus 1 records the data onto the optical disc D (hereinafter, referred to as "process before data recording"). It is noted that the process before data recording is executed by the system control unit 40 in the information recording and reproduction apparatus 1. In addition, when the optical disc D is inserted to the information recording and reproduction apparatus 1 and the recording instruction is given by the user and the like, the process before data recording is executed.

First, in step S101, the system control unit 40 determines whether or not the recording instruction for recording the data on the optical disc D is given. When the recording instruction is given (step S101; Yes), the process goes to step S102. On the contrary, when the recording instruction is not given (step S101; No), the process goes out of the routine and ends. For example, when the optical disc D is only inserted and the recording instruction is not given, the process after step S102 is not executed.

In step S102, the system control unit 40 executes the recording and detecting process of the adjustment RF signal. Though the process will be described in detail later, it is briefly explained now. In step S102, the system control unit 40 executes the process of detecting the adjustment RF signal recorded in the PCA 102 on the optical disc D. At the same time, when the adjustment RF signal is not detected, the process of recording the adjustment RF signal in the PCA 102 on the optical disc D is executed. Namely, in either case, in step S102, the system control unit 40 obtains the adjustment RF signal. Then, the process goes to step S103. It is noted that the system control unit 40 sometimes executes a preliminary OPC process at the time of the process in step S102, i.e., before recording the adjustment RF signal. This is because it is necessary for the system control unit 40 to determine the approximate laser power in order to record the adjustment RF signal.

In step S103, the system control unit 40 executes the mechanism adjustment on the basis of the obtained adjustment RF signal. Concretely, the system control unit 40 executes the focus position adjustment, the spherical aberration correction of the liquid crystal tilt and the like as the mechanism adjustment. Thereby, the OPC process and the recording operation of the data can be accurately executed. Then, the process goes to step S104.

In step S104, the system control unit 40 executes the OPC process. Concretely, the system control unit 40 executes the so-called test writing process by changing the light intensity stepwise in due order and recording the test writing data in the unused area 102*d* in the PCA 102. Afterward, the system control unit 40 reproduces the test writing data thus recorded, and determines the reproduction result on the basis of the predetermined evaluation standard to set the optimum laser power. Then, the process goes to step S105.

In step S105, the system control unit 40 sets the laser power to the laser power level determined in step S104 and starts recording of the data in the data recording area 104. Then, the process goes out of the routine.

As described above, the information recording and reproduction apparatus 1 according to this embodiment records the adjustment RF signal in an appropriate area such as PCA provided for the test writing for the OPC. Thereby, the information recording and reproduction apparatus 1 can execute the mechanism adjustment by using the adjustment RF signal without any problems, and can appropriately execute the OPC process on the basis of the mechanism adjustment.

Next, the description will be concretely given of the recording and detecting process of the adjustment RF signal in step S102 shown in FIG. 5, with reference to FIG. 6 and FIGS. 7A to 7D.

First, the description will be briefly given of the recording and detecting process of the adjustment RF signal according to this embodiment. As described above, the adjustment RF signal is recorded in the PCA 102 on the optical disc D. The information recording and reproduction apparatus 1 according to this embodiment efficiently searches the inside of the PCA 102 and detects the adjustment RF signal. Specifically, the information recording and reproduction apparatus 1 searches the inside of the PCA 102 in order from the position having high possibility that the RF signal is recorded, by taking account of the area in which the adjustment RF signal is recorded by the information recording and reproduction apparatus 1. In this case, the information recording and reproduction apparatus 1 changes the searching method based on whether or not the optical disc is the optical disc D onto which the adjustment RF signal is recorded by the information recording and reproduction apparatus 1. "The same information recording and reproduction apparatus" does not have to be the identical apparatus, but may be the same kind of apparatus (e.g., the apparatus by the same manufacture). Hereinafter, the assumption is same.

Further, when the adjustment RF signal is not detected by the above-mentioned search, the information recording and reproduction apparatus 1 according to this embodiment records the adjustment RF signal in the PCA 102 on the optical disc D. In this case, the information recording and reproduction apparatus 1 records the adjustment RF signal so that the PCA 102 having only the limited capacity is not wasted, and records the adjustment RF signal in the area in which the adjustment RF signal is rapidly detected in the recording and detecting process of the adjustment RF signal according to this embodiment.

Figure 6:
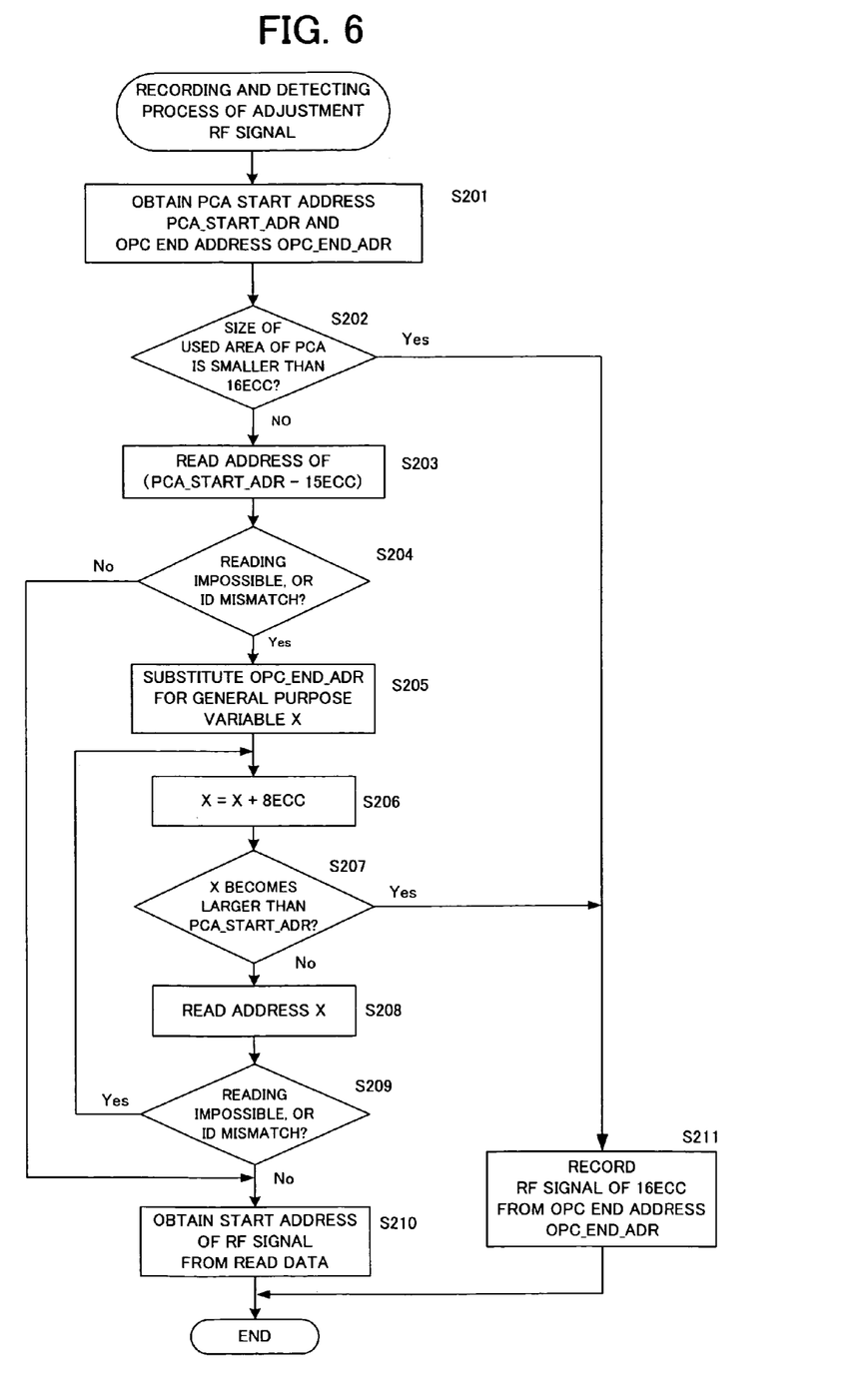
FIG. 6 is a flow chart showing a recording and detecting process of an adjustment RF signal according to the present invention.

The description will be concretely given of the recording and detecting process of the adjustment RF signal according to this embodiment below, with reference to a flow chart in FIG. 6. In order to supplement the explanation of the recording and detecting process of the adjustment RF signal, the recording configuration view in the PCA 102 shown in FIG. 7 is also used. It is noted that this process can be also executed by the system control unit 40. As described above, it is prescribed that the size of the adjustment RF signal area 102a is set to 16 ECC. Moreover, for convenience of the explanation, it is prescribed that the data other than the data according to the OPC process and the adjustment RF signal is not recorded in the PCA 102.

First, in step S201, the system control unit 40 obtains the PCA start address PCA_START_ADR and the OPC end address OPC_END_ADR. Then, the process goes to step S202.

Figure 7A:
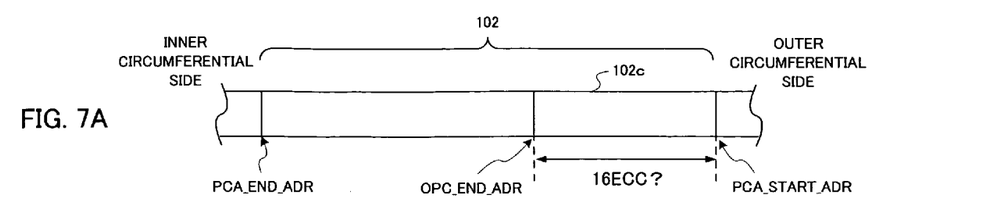
FIGS. 7A to 7D are diagrams explaining recording methods and detecting methods of the adjustment RF signal.

In step S202, the system control unit 40 determines whether or not the size of the used area 102c in the PCA 102 is smaller than 16 ECC. As shown in FIG. 7A, the size of the used area 102c in the PCA 102 corresponds to difference (distance) between the PCA start address PCA_START_ADR and the OPC end address OPC_END_ADR obtained in step S201.

The description will be given of a reason for executing the determination of step S202. In the used area 102c, there are only three cases: both of the OPC area 102b and the adjustment RF signal area 102a exist as described above; only the OPC area 102b exists; or nothing is recorded. In this embodiment, since the size of the adjustment signal area 102a is 16 ECC, if the size of the used area 102c is smaller than 16 ECC, the adjustment RF signal cannot be recorded in the used area 102c. On the contrary, when the size of the used area 102c is equal to or larger than 16 ECC, there is probability that the adjustment RF signal is recorded in the used area 102c. Namely, the determination in step S202 is executed in order to determine the existence or nonexistence of the probability that there is the adjustment RF signal area 102a in the used area 102c. Like this, the determination in step S202 is executed only based on the size of the used area 102c, without actually searching the inside of the used area 102c. Thereby, it is possible to rapidly execute the approximate determination whether or not the adjustment RF signal is recorded in the used area 102c.

When the size of the used area 102c is smaller than 16 ECC (step S202; Yes), the process goes to the step S211. On the contrary, when the size of the used area 102c is larger than 16 ECC (step S202; No), the process goes to step S203.

Figure 7B:
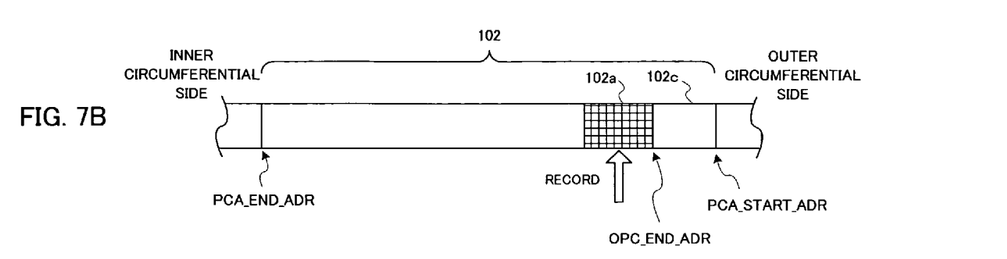

As shown by a netting area in FIG. 7B, in step S211, the system control unit 40 records the adjustment RF signal in the area of the size of 16 ECC so that the adjustment RF signal is arranged adjacently to the inner circumferential side of the OPC end address OPC_END_ADR, and further records the related information and the position information. Namely, when the adjustment RF signal is not recorded in the PCA 102, the system control unit 40 records the adjustment RF signal in the PCA 102. When the used area 102c is determined to be smaller than 16 ECC (step S202; Yes), the adjustment RF signal is recorded on the optical disc D from a position within a predetermined range from the PCA start address PCA_START_ADR, concretely, within 15 ECC from the PCA start address PCA_START_ADR. Thereby, next time the routine is executed to the optical disc D, it becomes possible to immediately detect the adjustment RF signal in step S204, which will be explained later. When the above-mentioned process ends, the process goes out of the routine.

Figure 7C:
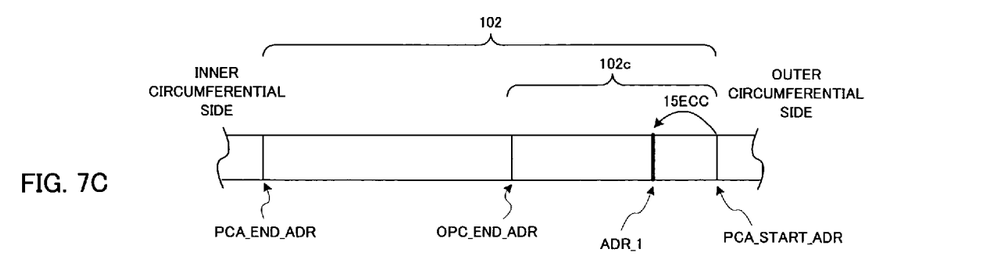

As shown in FIG. 7C, in step S203, the system control unit 40 reads data of an address ADR_1 (hereinafter simply referred to as "ADR_1") on the inner circumferential side by 15 ECC from the PCA start address PCA_START_ADR. Reading the data of ADR_1 like this is for determining whether or not the adjustment RF signal area 102a exists at the position. The description will be given of the reason for searching the data of ADR_1 in the first place in order to search the area in which the adjustment RF signal area 102a exists in the PCA 102. If the optical disc D being subjected to this routine has experienced the process of above-mentioned steps S202 to S211, the adjustment RF signal must be recorded in the area on the inner circumferential side by 15 ECC from the PCA start address PCA_START_ADR (i.e., within the predetermined range from the PCA start address PCA_START_ADR). Therefore, in order not to execute the unnecessary search to such the optical disc D, i.e., in order to rapidly process the optical disc D on which the adjustment RF signal is recorded by the information recording and reproduction apparatus 1, first, the data of ADR_1 is searched. When such the process of step S203 ends, the process goes to the step S204.

In step S204, the system control unit 40 determines whether or not the data of ADR_1 is unreadable, or whether the ID included in the data of ADR_1 is not identical to the ID included in the information recording and reproduction apparatus 1 executing the routine. As described above, the adjustment RF signal includes the position information and related information, concretely the start address of the RF signal and the ID, with the recording quality having the decodable level. Therefore, when the data of ADR_1 is unreadable, or when the ID is not identical (step S204; Yes), the data of ADR_1 is not the data of the adjustment RF signal. In this case, the process goes to step S205. The system control unit 40 can determine that the data is unreadable when the data cannot be read by one data decoding process. The case that the data is unreadable is a case that the error rate of the reproduction data is equal to or larger than the predetermined value (e.g., "$1 \times 10^{-3}$"), for example.

On the other hand, when the data of ADR_1 is readable and ID is identical (step S204; No), the process goes to step S210. In this case, the data of ADR_1 is the data of the adjustment RF signal. It can be said that the information recording and reproduction apparatus 1 records the RF signal on the optical disc D by the process of steps S202 to S211.

In step S205, the system control unit 40 substitutes the OCP end address OPC_END_ADR for a general purpose variable X. Then, the process goes to step S206. In step S206, the system control unit 40 executes a process of updating the variable X by adding "8 ECC" to the current variable X to obtain a new variable X. In this case, the address shown by the variable X (hereinafter referred to as "address X") moves to the outer circumferential side of the OPC end address OPC_END_ADR by 8 ECC. Then, the process goes to step S207.

In step S207, the system control unit 40 determines whether or not the above-mentioned address X goes out of the PCA start address PCA_START_ADR. In step S209 which will be explained later, the process of determining whether or not the data of the address X is the data of the adjustment RF signal is executed. However, when the address X reaches the outside of the PCA 102, even though such the determination is not executed, it is clear that the adjustment RF signal does not exist in the PCA 102. Namely, the determination in step S207 is executed in order not to waste time in detecting the RF signal.

When the address X goes out of the PCA start address PCA_START_ADR (step S207; Yes), the process goes to step S211. In step S211, the system control unit 40 records the adjustment RF signal of the size of 16 ECC so that the adjustment RF signal is arranged adjacently to the inner circumferential side of the OPC end address OPC_END_ADR. Namely, when the adjustment RF signal is not found by the search in the PCA 102, the adjustment RF signal is recorded in the PCA 102.

On the contrary, when the address X does not go out of the PCA start address PCA_START_ADR (step S207; No), the process goes to step S208.

In step S208, the system control unit 40 reads the data of the above-mentioned address X. Then, the process goes to step S209. In step S209, similarly to the process in above-mentioned step S204, the system control unit 40 determines whether or not the data of the address X is unreadable, or whether the ID of the data of the address X is not identical to the ID included in the information recording and reproduction apparatus 1. Thereby, it can be determined whether or not the data of the address X is the data of the adjustment RF signal.

When the data of the address X is unreadable or the IDs are not identical to each other (step S209; Yes), the process returns to step S206. In this case, the process after step S206 is executed again. Namely, the above-mentioned determination in step S209 is executed to the data of the address obtained by further adding 8 ECC to the address X. When the updated address X is in the PCA 102 (step S207; No) and the data of the address X is not the data of the adjustment RF signal (step S209; Yes), the process after step S206 is executed again. Namely, until the RF signal is detected from the PCA 102, the search in the PCA 102 is executed (concretely, the loop from step S206 to step S209 is repeatedly executed).

Figure 7D:
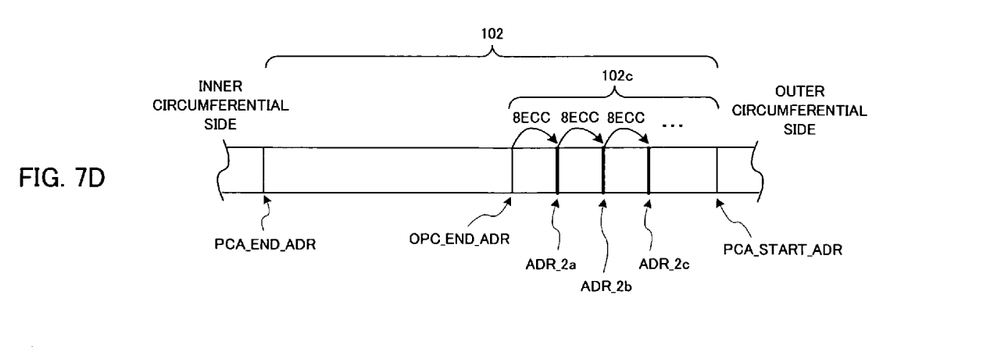

FIG. 7D shows such a state that the search for the adjustment RF signal is executed. When the adjustment RF signal is not detected around the PCA start address PCA_START_ADR, the determination whether or not the data is the data in the adjustment RF signal area 102a, i.e., the determination in step S209, is executed to the data of the address moved by 8 ECC from the OPC end address OPC_END_ADR to the outer circumferential side. Concretely, the determination in step S209 is executed to data of addresses ADR_2a, ADR_2b, ADR_2c, . . . , which are moved by 8 ECC respectively from the OPC end address OPC_END_ADR to the outer circumferential side, in the order. When it is determined that the data of the address is the data in the adjustment RF signal area 102a by the determination, the process goes out of the loop of steps S206 to S209 and goes to step S210.

It is expected that the area arranged adjacently to the portion used for the OPC process is difficult to decode. Judging from a probability, if the area is searched by the unit of 8 ECC, the adjustment RF signal can be securely detected. Therefore, as described above, the search is executed with moving the address by 8 ECC. The area moved at the time of the search is not limited to 8 ECC, and may be within the range from 8 ECC to 14 ECC. In addition, on the optical disc D on which the process in steps S207 to S211 is executed by the information recording and reproduction apparatus 1, it is highly possible that the RF signal is recorded in the area near the OPC end address OPC_END_ADR, not near the PCA start address PCA_START_ADR. Therefore, the search is performed from the OPC end address OPC_END_ADR to the outer circumference side.

On the contrary, when the data of the address X is readable and the IDs are identical to each other (step S209; No), the process goes to step S210. In step S210, the system control unit 40 obtains, from the read data, the position information of the adjustment RF signal, e.g., the start address AD of the adjustment RF signal area 102a. Thereby, the system control unit 40 can obtain the adjustment RF signal which is actually used for the mechanism adjustment. When the above-mentioned process ends, the process goes out of the routine. After going out of the routine, the process goes to step S103 of the flow chart shown in FIG. 5, and the system control unit 40 executes the mechanism adjustment.

The related information and the position information may be recorded in the adjustment RF signal area 102a at plural times. As described above, when the address X is varied by 8 ECC and the data is read, if either the related information or the position information recorded at the plural times is read, the RF signal can be obtained.

Additionally, in the recording and detecting process of the adjustment RF signal according to this embodiment, a process of determining whether or not the number of executing the process of steps S206 to S209 becomes larger than a predetermined number (e.g., 5 times) may be executed between steps S207 and S208. The process is executed in order not to waste the time in searching the RF signal. For the same reason, a process of determining whether or not a time period in executing the process of the steps S206 to S209 becomes larger than a predetermined time period (e.g., 2 seconds) may be executed. In this case, though the adjustment RF signal may be actually in the PCA 102, the adjustment RF signal is newly recorded without wasting the time in detecting the RF signal, similarly to the case that no adjustment RF signal exists.

As described above, the information recording and reproduction apparatus 1 according to this embodiment records the adjustment RF signal so that the adjustment RF signal is easily detected by the recording and detecting process of the adjustment RF signal, and searches the adjustment RF signal by taking account of the position on which the adjustment RF signal is recorded by the recording and detecting process of the adjustment RF signal. Thereby, the information recording and reproduction apparatus 1 can immediately detect the adjustment RF signal recorded onto the optical disc D. The information recording and reproduction apparatus 1 searches the data recorded in the PCA 102, and records the adjustment RF signal adjacently to the used area 102c of the PCA 102 so that the unused area is not created between the used area 102c and the adjustment RF area 102a. Therefore, the PCA 102 is never wasted.

The invention may be embodied on other specific forms without departing from the spirit or essential characteristics thereof. The present embodiments therefore to be considered in all respects as illustrative and not restrictive, the scope of the invention being indicated by the appended claims rather than by the foregoing description and all changes which come within the meaning an range of equivalency of the claims are therefore intended to embraced therein.

The entire disclosure of Japanese Patent Application No. 2004-193409 filed on Jun. 30, 2004 including the specification, claims, drawings and summary is incorporated herein by reference in its entirety.

What is claimed is:

1. An information recording apparatus which irradiates a laser light onto a recording medium recordable once and records information, comprising:
    a recording unit which records an adjustment RF signal in a predetermined area on the recording medium used for calibrating the laser light; and
    a detecting unit which detects the adjustment RF signal recorded in the predetermined area,
    wherein the recording medium has no area in which an RF signal is recorded in the entire circumference,
    wherein the adjustment RF signal is used for a mechanism adjustment in an optical pickup,
    wherein the detecting unit includes a unit which obtains an RF signal from the predetermined area and a determining unit which determines the RF signal as the adjustment RF signal when the obtained RF signal is decodable, and
    wherein the detecting unit determines that the adjustment RF signal is not recorded in the predetermined area, when an information amount of information recorded in the predetermined area is smaller than a unit information amount of the adjustment RF signal; when the determining unit determines that substantially the entire data in the predetermined area is not the adjustment RF signal; or when a time period or a number of times for which or at which the determining unit executes determination satisfies a predetermined condition.

2. The information recording apparatus according to claim 1, wherein the adjustment RF signal includes position information indicating a recording position of the adjustment RF signal on the recording medium.

3. The information recording apparatus according to claim 1, wherein the recording unit records the adjustment RF signal in an unrecorded area adjacent to an area in which the information is recorded in the predetermined area, when the detecting unit determines that the adjustment RF signal is not recorded in the predetermined area.

4. The information recording apparatus according to claim 1, wherein the determining unit first determines whether or not the adjustment RF signal exists within a range of predetermined data amount from a start position of the predetermined area, and determines whether or not the information is the adjustment RF signal in order from latest recorded information in the predetermined area when determining that the adjustment RF signal does not exist within the range.

5. The information recording apparatus according to claim 1, wherein the recording unit records the adjustment RF signal in a Power Control Area (PCA) on the recording medium.

6. An information recording method which irradiates a laser light onto a recording medium recordable once and records information, comprising:
    a recording process which records an adjustment RF signal in a predetermined area on the recording medium used for calibrating the laser light; and
    a detecting process which detects the adjustment RF signal recorded in the predetermined area,
    wherein the recording medium has no area in which an RF signal is recorded in the entire circumference,
    wherein the adjustment RF signal is used for a mechanism adjustment in an optical pickup,
    wherein the detecting process includes a process which obtains an RF signal from the predetermined area and a determining process which determines the RF signal as the adjustment RF signal when the obtained RF signal is decodable, and
    wherein the detecting process determines that the adjustment RF signal is not recorded in the predetermined area, when an information amount of information recorded in the predetermined area is smaller than a unit information amount of the adjustment RF signal; when the determining process determines that substantially the entire data in the predetermined area is not the adjustment RF signal; or when a time period or a number of times for which or at which the determining process executes determination satisfies a predetermined condition.

7. A computer program product in a non-transitory computer-readable medium executed by an information recording apparatus including a computer and an optical pickup irradiating a laser light onto a recording medium recordable once, the information recording apparatus making the computer function as:
    a recording control unit which controls the optical pickup so that an adjustment RF signal is recorded in a predetermined area on the recording medium used for calibrating the laser light; and
    a detecting control unit which controls the optical pickup so that the adjustment RF signal recorded in the predetermined area is detected,
    wherein the recording medium has no area in which an RF signal is recorded in the entire circumference,
    wherein the adjustment RF signal is used for a mechanism adjustment in an optical pickup,
    wherein the detecting control unit includes a unit which obtains an RF signal from the predetermined area and a determining unit which determines the RF signal as the adjustment RF signal when the obtained RF signal is decodable, and wherein the detecting control unit determines that the adjustment RF signal is not recorded in the predetermined area, when an information amount of information recorded in the predetermined area is smaller than a unit information amount of the adjustment RF signal; when the determining unit determines that substantially the entire data in the predetermined area is not the adjustment RF signal; or when a time period or a number of times for which or at which the determining unit executes determination satisfies a predetermined condition.

8. An information recording apparatus for recording information onto a recording medium recordable once, the information recording apparatus comprising:

an optical pickup;

a recording controller configured to perform laser light power calibration by recording test data within a power control area of the recording medium defined by a power control area start address and a power control area end address; and a detector configured to detect a recorded adjustment RF signal recorded within the power control area, wherein the recording controller is further configured to record, within the power control area of the recording medium, an adjustment RF signal used in mechanism adjustment of the optical pickup, wherein the recording medium has no area in which an RF signal is recorded in the entire circumference, and wherein the recording controller records the adjustment RF signal if the detector fails to detect a recorded adjustment RF signal.

9. The information recording apparatus according to claim 8, wherein detecting of an adjustment RF signal by the detector comprises detecting an amount of information recorded in the power control area.

10. The information recording apparatus according to claim 8, wherein detecting of an adjustment RF signal by the detector comprises checking multiple addresses within the power control area.

11. The information recording apparatus according to claim 8, wherein the adjustment RF signal comprises an apparatus manufacturer identifier.

12. The information recording apparatus according to claim 8, wherein the adjustment RF signal comprises address information.

13. The information recording apparatus according to claim 8, wherein the recording controller is configured to record the adjustment RF signal within the power control area at an unused area thereof adjacent to a used area thereof.

14. The information recording apparatus according to claim 8, wherein the recording medium comprises a DVD+R recording medium.

15. The information recording apparatus according to claim 8, wherein the recording controller records the adjustment RF signal to have an area of at least three tracks.

16. An information recording apparatus for recording information onto a recording medium recordable once, the information recording apparatus comprising:

an optical pickup; and a recording controller configured to perform laser light power calibration by recording test data within a power control area of the recording medium defined by a power control area start address and a power control area end address, wherein the recording controller is further configured to record, within the power control area of the recording medium, an adjustment RF signal used in mechanism adjustment of the optical pickup, wherein the recording medium has no area in which an RF signal is recorded in the entire circumference, and wherein the recording controller is configured to record the adjustment RF signal within the power control area at an unused area thereof adjacent to a used area thereof.

17. The information recording apparatus according to claim 16, further comprising:

a detector configured to detect a recorded adjustment RF signal recorded within the power control area, wherein the recording controller records the adjustment RF signal if the detector fails to detect a recorded adjustment RF signal.

18. The information recording apparatus according to claim 17, wherein detecting of an adjustment RF signal by the detector comprises detecting an amount of information recorded in the power control area.

19. The information recording apparatus according to claim 17, wherein detecting of an adjustment RF signal by the detector comprises checking multiple addresses within the power control area.

20. The information recording apparatus according to claim 16, wherein the adjustment RF signal comprises an apparatus manufacturer identifier.

21. The information recording apparatus according to claim 16, wherein the adjustment RF signal comprises address information.

22. The information recording apparatus according to claim 16, wherein the recording medium comprises a DVD+R recording medium.

23. The information recording apparatus according to claim 16, wherein the recording controller records the adjustment RF signal to have an area of at least three tracks.

* * * * *